Sept. 20, 1971 C. J. HAYCOCK 3,606,496

TRACK UNIT FOR WHEELED VEHICLES

Filed Jan. 21, 1969 2 Sheets-Sheet 1

INVENTOR:
CAL J. HAYCOCK

BY:
B. Dean Griddle

ATTORNEY.

Sept. 20, 1971   C. J. HAYCOCK   3,606,496
TRACK UNIT FOR WHEELED VEHICLE
Filed Jan. 21, 1969   2 Sheets-Sheet 2
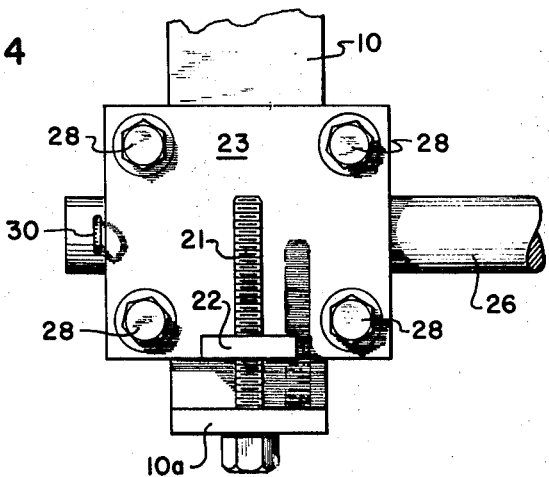
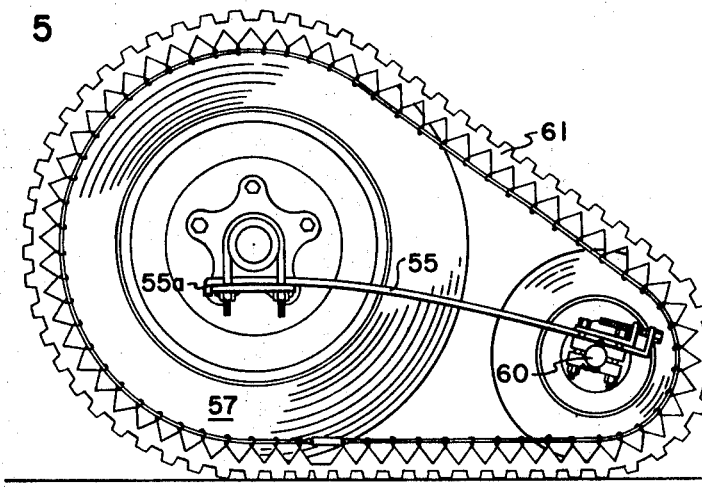
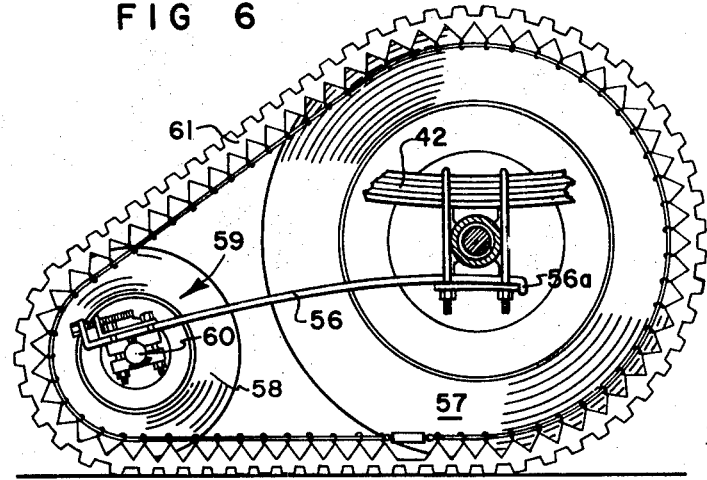
INVENTOR:
CAL J. HAYCOCK
BY:
ATTORNEY

# United States Patent Office 3,606,496
Patented Sept. 20, 1971

3,606,496
TRACK UNIT FOR WHEELED VEHICLES
Cal J. Haycock, 591 Malibu Drive,
Salt Lake City, Utah 84107
Filed Jan. 21, 1969, Ser. No. 792,311
Int. Cl. B62d 55/16
U.S. Cl. 305—29                               3 Claims

ABSTRACT OF THE DISCLOSURE

An adapter unit comprising a spring-type support beam, a guide roller resiliently carried by the beam, and arranged to be aligned with a vehicle drive wheel, and an endless track adapted to fit around the drive wheel and roller and to be powered by operation of the drive wheel.

BRIEF DESCRIPTION

This invention relates to units for converting conventional wheeled vehicles to track laying vehicles. There have been many arrangements proposed in the past for converting wheeled vehicles to track laying vehicles so that they will have a more general utility. With a wheeled drive a vehicle is usually quite limited as to the terrain it can traverse and it generally has greatly reduced mobility in inclement weather. Track vehicles, however, are not so limited. The increased traction and flotation afforded through use of the larger ground engaging surface of an endless track will usually permit a tracked vehicle to travel over rough terrain that would be impassable to a wheeled vehicle and to continue travel in snow or mud, or the like, that would trap a wheeled vehicle.

Yet, while the wheeled vehicle may not be as versatile, it is generally superior to the tracked vehicle where smooth roads are to be traversed at high speeds.

Because of the costs involved, or for other reasons, it is not always possible to have both a wheeled and a tracked vehicle available for use, even though the needs exist for both.

It is an object of the present invention to provide a relatively inexpensive unit for use in easily converting conventional wheel driven vehicles to be track laying vehicles.

There have been many units proposed in the past for converting wheel driven vehicles to track laying vehicles. One such unit is disclosed in U.S. Pat. No. 2,110,587, where a solid frame has spring-biased rollers aligned with a vehicle wheel such that an endless track can be passed around the vehicle wheel and the rollers.

However, so far as I am aware, there has not heretofore been a unit for converting wheel driven vehicles to track laying vehicles that utilizes a flat or leaf spring-type support beam for a roller or rollers around which an endless track is passed. Such a support beam maintains a pre-set tension in the endless track while facilitating vertical travel of the roller or rollers as the track is moved over uneven terrain.

Principal features of the invention include a flat or leaf spring-type support beam having at least one roller arranged, when installed, to be in alignment with a drive wheel of a vehicle and movable with respect to the beam so that desired tension can be set and maintained in an endless track that is fitted around the drive wheel and the roller. Adjustment means are provided for moving the roller with respect to the beam and the endless track is designed to be easily positioned and removed while overlapping to the sides of the wheels and rollers so that it will not work off as the vehicle travels.

THE DRAWINGS

Figure 1:
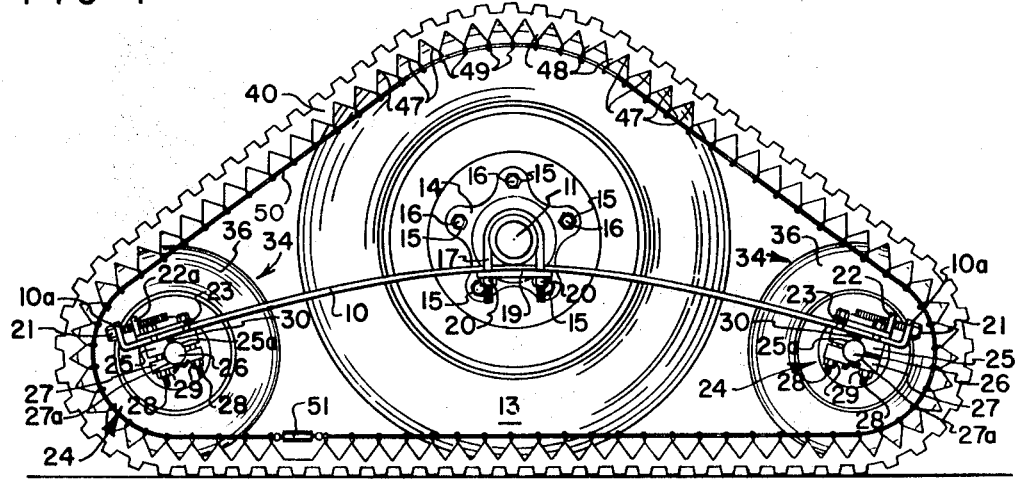
Figure 2:
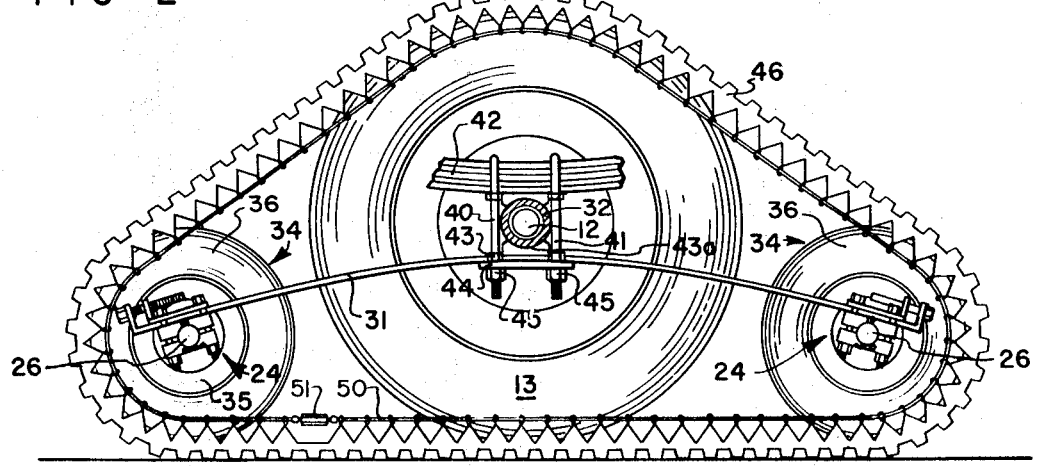
Figure 3:
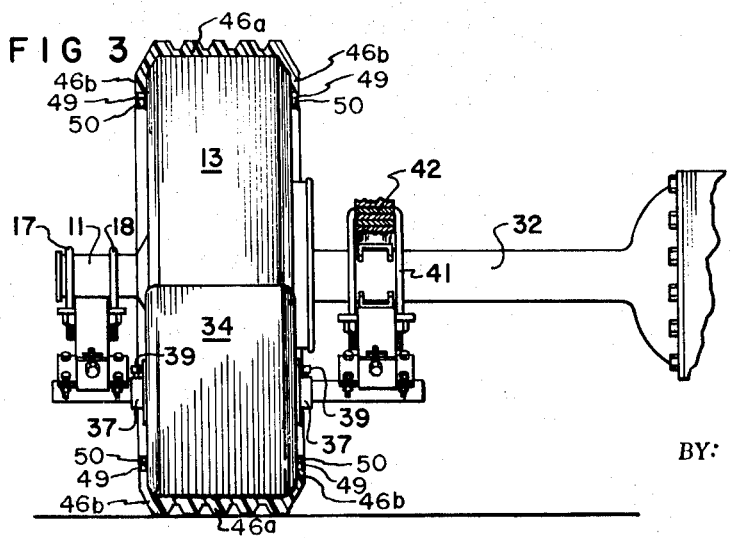

FIG. 1 is a side elevation of one embodiment of the unit of the invention, shown positioned with respect to the outer side of a vehicle drive wheel;

FIG. 2, a similar view, taken with respect to the inner side of the vehicle drive wheel;

FIG. 3, an end elevation view, with the endless track broken away for clarity;

FIG. 4, an enlarged top plan view of the adjusting mechanism, with a support beam and roller axle shown fragmentarily;

FIG. 5, a view like FIG. 1, but showing an embodiment of the track unit of the invention utilizing a single roller; and FIG. 6, a view like FIG. 2, but showing the same track unit as is shown in FIG. 6.

DETAILED DESCRIPTION

Referring now the drawings:

In the embodiment shown in FIGS. 1-3, an outside, flat or leaf type spring-steel support beam 10 is shown mounted intermediate its length to a stub axle 11 that can be either fixed to the axle 12 (FIG. 2) of wheel 13 or that can be projected, in alignment with axle 12, from a plate 14 that is held by nuts 15 on the lug bolts 16 of the wheel. The stub axle rotates with the wheel.

A pair of spaced U-clamps 17 and 18 each straddle the stub axle to pass through holes in a plate 19 before receiving nuts 20 on the threaded ends thereof. The support beam 10 is then passed between the spaced U-clamps and the stub axle. The stub axle rotates inside the U-clamps and, if desired, bearings (not shown) can be provided to reduce friction between the axle and the clamps.

Beam 10 is upturned at each end 10a and has a hole through each upturned end through which a bolt 21 is inserted. The bolt is then threaded into an upstanding ear 22 on an upper plate 23 of an adjustment assembly, shown generally at 24. The adjustment asemblies each also include a lower plate 25 that fits against the underside of the support beam 10 and that is provided with a saddle 25a to receive the upper surface of a spindle 26.

A bottom plate 27 has a saddle 27a in the upper surface thereof to receive the lower surface of spindle 26 and a pair of bolts 28 are inserted through the plates 23, 25 and 27 at each side of the support beam 10. Nuts 29, threaded onto the bolts 28 then clamp the plates together, with the support beam 10 between plates 23 and 25 and the end of spindle 26 between plates 25 and 27.

Cotter keys 30, inserted through spindle 26 outside of the plates 25 and 27, hold the spindle against movement through the plates.

Preferably, another inside spring-steel support beam 31 identical to support beam 10 is suspended from the axle housing 32 of the vehicle at the inside of the wheel 13, and an adjustment mechanism 33, identical to the adjustment mechanism 24 is provided at each end thereof.

The ends of spindles 26, not held by the adjustment mechanisms 24 on beam 10 are then securely clamped by the oppositely positioned adjustment mechanisms 24 on beam 31.

Each spindle 26 has a roller 34 mounted thereon and aligned with the wheel 13 and each roller includes a central hub 35 that is journaled on its spindle 29 and a pneumatic tire 36, mounted on the hub. Collars 37 and 38, FIG. 3 slide onto the spindle at opposite sides of the hub 35 and are secured in place on the spindle by set screws 39. The collars 37 and 38 thus hold the roller against movement longitudinally along the spindle, while allowing it to freely rotate thereabout.

The support beam 31 is suspended by U-bolts 40 and 41 that straddle the leaf spring assembly 42 of the vehicle, at opposite sides of the axle housing 32. The legs of the U-bolts all extend downwardly from the spring assembly to pass through a plate 43 beneath the axle housing and another plate 44. The support beam 31 is then passed between the legs of each U-bolt and between the plates 43 and 44 and is clamped in place by nuts 45, threaded onto the legs of the U-bolts.

Plate 43 is preferably provided with a saddle 43a that will conform to the shape of the axle housing. With this arrangement, the support beam 31 is held essentially parallel to the beam 10.

An endless track 46 is fitted over the vehicle wheel 13 and the rollers 34 and the bolts 21 on the ends of the support beams are turned to move the rollers toward or away from the wheel, as required, to insure proper tension in the endless track.

While other tracks that can be frictionally driven by rotation of the wheel 13 may be suitable, the one illustrated is presently preferred.

As shown, the track comprises a continuous backing member 46a, of suitable fabric reinforced rubber, or the like, having an exterior tread and formed at 46b to extend slightly over each side of each of the wheel 13 and rollers 36.

At each side the backing member is turned to overlap the wheel and rollers and is triangularly notched at 47 along its length such that a series of apexes 48 are formed. A ring 49 is secured to each apex and cables 50 are passed through the rings on each side of the wheel and rollers and the ends of the cables are connected and the cable is drawn tight by a turnbuckle 51.

In operation, rotation of wheel 13, through the usual vehicle drive, frictionally drives the endless track 40. The rollers 34 turn with the track and flexure of the spring making up beam 10 allows them to move up and down, as they pass over the ground surface. However, since the distance between rollers does not vary, after the track tension has been set, the tension will at all times remain constant.

While a pair of cooperating spring support beams are usually preferred for each wheel, it should be apparent that a single support beam, with spindles cantilevered therefrom to journal the rollers could be used, and may, at times, be preferred.

Also, while a track unit has been shown for only one drive wheel of the vehicle, there will normally be a track unit for each drive wheel and, with but minor modifications, a unit can usually be mounted on each steering wheel of the vehicle, as well.

In FIGS. 5 and 6, there is shown another embodiment of the invention, wherein each identical outer and inner support beam 55 and 56, respectively, has one end secured adjacent to the central axis of wheel 57 and a trailing roller 58 is fixed to the other end, through a tension adjustment assembly 59, corresponding to the tension adjustment assemblies 24 previously described.

The ends of both the outside and inside flat or leaf spring-type support beams 55 and 56 are secured to the central axis of wheel 57 and are clamped between plates in the same manner as are the centrally clamped beams 10 and 31 previously described, but are then bent over at 55a and 56a, respectively, to prevent any tendency of the ends of the beams to slide out of their clamping members. The spindle 60 for the roller 58 is secured in place by the adjustment assemblies in the same manner as are the spindles previously described.

An endless track 61 is constructed and secured in place in the same manner as track 40, but in this embodiment is only passed around wheel 57 and the single roller 58, which usually acts as a trailing roller, to thereby make a half-track unit.

With the arrangement of FIG. 5 and 6, vehicle flotation and traction are achieved using only a single roller assembly. This arrangement does not provide the same amount of flotation achieved using a full track with both leading and trailing rollers, but it is often entirely satisfactory for light vehicles or in conditions wherein less flotation and traction is required.

As before, driving of wheel 57, frictionally drives the track to provide the vehicle drive.

Also as before, a single support beam having a cantilevered spindle for journalling roller 57 may be satisfactory for many purposes, and the unit can be used on vehicle steering wheels as well as drive wheels. Furthermore, a single trailing roller and half track unit can be used with vehicle steering wheels while a full track, with both leading and trail rollers is used on the drive wheels.

While preferred embodiments of my invention have been shown and described, it is anticipated that changes can be made.

I claim:

1. A track unit for wheeled vehicles comprising
at least one leaf spring serving as a spring support beam;
means for securing the leaf spring at one of its ends adjacent to an axis of a wheel of a vehicle;
at least one guide roller carried by the other end of the leaf spring a spaced distance from the wheel when the beam is secured adjacent to the central axis of the vehicle wheel;
means for moving said guide roller longitudinally with respect to the leaf spring; and
an endless track adapted to fit over the wheel and the guide roller, said track comprising a continuous belt having a central longitudinal surface provided with cleats, a series of apexes along each side thereof and cable means adapted to interconnect the apexes at the sides of the wheel and said roller, and turnbuckle means for tightening the cable means.

2. A track unit for wheeled vehicles comprising
at least one leaf spring serving as a spring support beam;
means for securing the leaf spring at its mid-portion to the axis of rotation of a wheel of a vehicle;
a guide roller carried by each end of the leaf spring;
means for moving said guide rollers longitudinally with respect to the leaf spring; and
an endless track adapted to fit over the wheel and the guide rollers, said track comprising a continuous belt having a central longitudinal surface provided with cleats, a series of apexes along each side thereof and cable means adapted to interconnect the apexes at the sides of the wheel and rollers, and turnbuckle means for tightening the cables.

3. In combination
a vehicle having an axle housing, a leaf spring assembly above the axle housing for supporting the vehicle frame, an axle extending through the housing, and a wheel on one end of the axle;
leaf spring support beams mounted at each lateral side of the wheel below the axle housing;
means for securing the beam on the axle side of the wheel to the leaf spring above the axle housing, said means including U-bolts that extend past opposite sides of the axle housing and that straddle the leaf spring and the spring support beam, clamp means fitting over the ends of the bolts beneath the leaf spring support beam, and nuts on the ends of the U-bolts holding said clamp means in place;
a stub axle removably fixed to the wheel on the side opposite the axle, said stub axle being aligned with the axle and rotatable with the wheel;
support means suspending the beam on the stub axle side of the wheel from the stub axle, said stub axle being rotatable within said support means and said support means suspending the beam substantially parallel to the other beam and holding said beam against twisting with respect to said stub axle;
at least one guide roller carried by adjacent ends of the substantially parallel beams a spaced distance from the wheel;

an endless track adapted to fit over the wheel and each said guide roller; and means for securing said track around the wheel and each said roller, whereby rotation of the wheel will drive the track.

References Cited

UNITED STATES PATENTS

| | | | |
|---|---|---|---|
| 1,774,835 | 9/1930 | Lombard | 305—32X |
| 2,314,295 | 3/1943 | Wampfler | 305—31X |
| 2,644,539 | 7/1953 | Gazda | 180—9.58 |
| 2,693,354 | 11/1954 | Walter | 267—52 |
| 2,896,963 | 7/1959 | Ramun | 180—15X |

FOREIGN PATENTS

| | | | |
|---|---|---|---|
| 1,198,090 | 6/1959 | France | 305—23 |
| 572,698 | 10/1945 | Great Britain | 305—23 |
| 89,691 | 9/1957 | Norway | 305—32 |

RICHARD J. JOHNSON, Primary Examiner

U.S. Cl. X.R.

180—9.58